Figure 1:
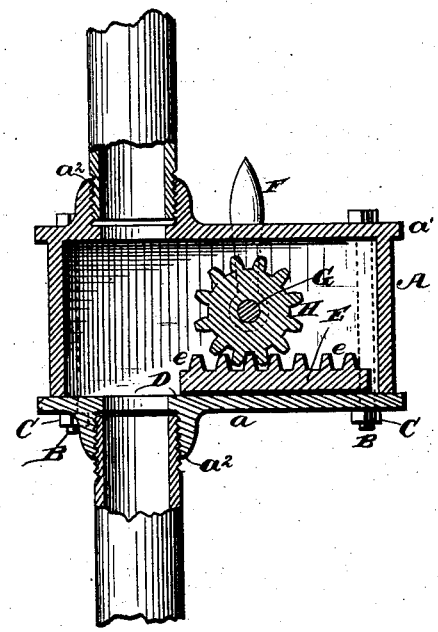

(No Model.)

G. L. BRADLEY.
STRAIGHT WAY VALVE AND CASING.

No. 260,829. Patented July 11, 1882.

Witnesses.
Robert Everett,
J. A. Rutherford

Inventor.
Gilbert L. Bradley.
By H. W. Mason,
Atty.

UNITED STATES PATENT OFFICE.

GILBERT L. BRADLEY, OF NEW BEDFORD, MASSACHUSETTS.

STRAIGHT-WAY VALVE AND CASING.

SPECIFICATION forming part of Letters Patent No. 260,829, dated July 11, 1882.

Application filed March 31, 1882. (No model.)

*To all whom it may concern:*

Be it known that I, GILBERT L. BRADLEY, a citizen of the United States, residing at New Bedford, in the county of Bristol and State of Massachusetts, have invented certain new and useful Improvements in Straight-Way Valves and their Casings, of which the following is a specification.

This invention relates to that class of straight-way slide-valves in which the valve is provided with a series of rack-teeth, and a pinion is fixed upon a rotary shaft so as to engage the rack-teeth and actuate the slide-valve.

The object of my invention is to provide, in connection with a valve of such construction, an improved two-part valve-box which can be readily applied to or disconnected from the pipes, and which can be made and sold as an outside independent of any particular form of pipe, and without requiring any change whatever in the construction of an ordinary pipe, excepting that the ends of the pipes which connect with the valve-box be externally screw-threaded. This object I attain by means of the devices illustrated in the drawings, in which—

Figure 2:
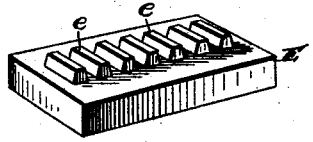
Figure 3:
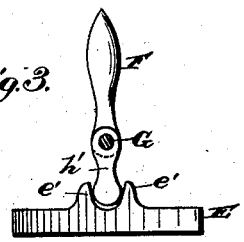

Figure 1 is a vertical section taken centrally through the valve-box and valve. Fig. 2 is a perspective view of the valve, and Fig. 3 represents a modified construction of valve and valve-lever.

The valve-box A is preferably constructed with its top and sides in one piece, the bottom $a$ of this box being secured to the upper portion thereof by means of the bolts B, which will pass through a flange, $a'$, surrounding the top of the box, and also through the detachable bottom, which extends beyond the sides of the box, as illustrated in Fig. 1, these said two parts of the box being held firmly together by tightening up against the bottom the nuts C, that are fitted upon the screw-threaded ends of the tie-bolts. The top and bottom of the box are each provided with a screw-threaded socket, $a^2$, for coupling the same with the steam-pipes. These sockets are located near one end of the box, so that space will be left within the latter at one side of a direct line between the two steam-ports for the device employed to slide the valve, this construction also providing a seat, D, upon the bottom of the box for the valve to rest and slide upon in opening the valve.

The valve E consists of a flat rectangular block dressed smooth upon its under side, and upon its upper side provided with a rack set of teeth, $e$. The valve-lever F, by which this valve is controlled, is located at one side of the box, upon a rock-shaft, G, which passes transversely through the box and has its bearings in the vertical sides thereof.

A pinion, H, fixed upon this rock-shaft within the valve-box, engages with the rack-teeth of the valve, so that by operating the valve-lever, in order to give a partial rotation to the pinion, the valve will be closed over the steam-port or slid back to open the same.

In the modification shown in Fig. 3 the pinion is dispensed with, and in lieu thereof a pendent arm, $h$, is secured to or formed with the rock-shaft. This arm is received at its lower end in a concave seat that is formed between the two projections $e'$ upon the top side of the valve. It will be obvious that when the valve-lever in this instance is vibrated the valve will be caused to slide upon the bottom of the box in the manner described in connection with Fig. 1.

By unscrewing the nuts from the tie-rod the box can be taken apart and both the valve and the valve-seat dressed as occasion may require.

From the foregoing it will be seen that the pipes are of ordinary shape, and that no change in their construction is required, whereby there will be no increase of cost in their manufacture, the mere screw-threading their ends being effected at a nominal cost. The valve-box is made complete in itself, and by having the screw-threaded sockets it can be readily connected with or detached from the pipes. It can also be made and sold separately from the pipes, and its bottom can at any time be detached, so that the valve-seat thereon can be easily dressed.

Having thus described my invention, what I claim is—

The combination of the straight-way slide-valve having rack-teeth, and the pinion fixed upon a rock-shaft and engaging the teeth of said valve, with the herein-described two-part valve-box A, constructed with a detachable bottom, $a$, and a flanged upper portion, to which the detachable bottom is secured by bolts and nuts, each of said two parts being provided with a steam-port and with a screw-threaded socket, $a^2$, for connecting with the end of a pipe, said members being constructed and organized as shown and specified.

In testimony whereof I have hereunto set my hand in the presence of the subscribing witnesses.

GILBERT L. BRADLEY.

Witnesses:
WALTER A. JENNEY,
THOS. M. JAMES.